(12) United States Patent
Rosenfeld et al.

(10) Patent No.: US 11,809,332 B2
(45) Date of Patent: Nov. 7, 2023

(54) PREFETCH DATA ASSOCIATED WITH TLB FILL REQUESTS

(71) Applicant: Micron Technology, Inc., Boise, ID (US)

(72) Inventors: Paul Rosenfeld, Rockville, MD (US); Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 37 days.

(21) Appl. No.: 17/548,948

(22) Filed: Dec. 13, 2021

(65) Prior Publication Data

US 2023/0185730 A1    Jun. 15, 2023

(51) Int. Cl.
*G06F 12/1045* (2016.01)
*G06F 12/02* (2006.01)
*G06F 12/0862* (2016.01)
*G06F 12/1009* (2016.01)

(52) U.S. Cl.
CPC ...... *G06F 12/1063* (2013.01); *G06F 12/0238* (2013.01); *G06F 12/0862* (2013.01); *G06F 12/1009* (2013.01); *G06F 12/1054* (2013.01)

(58) Field of Classification Search
CPC ............ G06F 12/0238; G06F 12/0862; G06F 12/1009; G06F 12/1054; G06F 12/1063
See application file for complete search history.

(56) References Cited

U.S. PATENT DOCUMENTS

| 5,937,437 | A | 8/1999 | Roth et al. |
| 7,305,534 | B2 | 12/2007 | Watt et al. |
| 7,805,588 | B2 | 9/2010 | Bridges et al. |
| 8,078,806 | B2 | 12/2011 | Diefendorff |
| 2017/0097896 | A1* | 4/2017 | Molnar ................. G06F 12/145 |
| 2019/0155736 | A1* | 5/2019 | Hagersten ........... G06F 12/0811 |

\* cited by examiner

*Primary Examiner* — Aracelis Ruiz
(74) *Attorney, Agent, or Firm* — Brooks, Cameron & Huebsch, PLLC

(57) ABSTRACT

An apparatus includes circuitry couplable to a host system and a memory device. The circuitry is configured to determine whether a page table maintained on the circuitry includes a physical address of the memory device corresponding to a virtual address associated with a TLB fill request from the host system. Responsive to determining that the page table includes the physical address, the circuitry provides signaling indicative of a completion to the TLB fill request to the host system, prefetch a page of data at the physical address from the memory device using the physical address from the page table, and provide signaling indicative of the page of data to the host system.

17 Claims, 6 Drawing Sheets

PREFETCH DATA ASSOCIATED WITH TLB FILL REQUESTS

TECHNICAL FIELD

Embodiments of the disclosure relate generally to memory sub-systems, and more specifically, relate to translation lookaside buffer (TLB) access monitoring.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
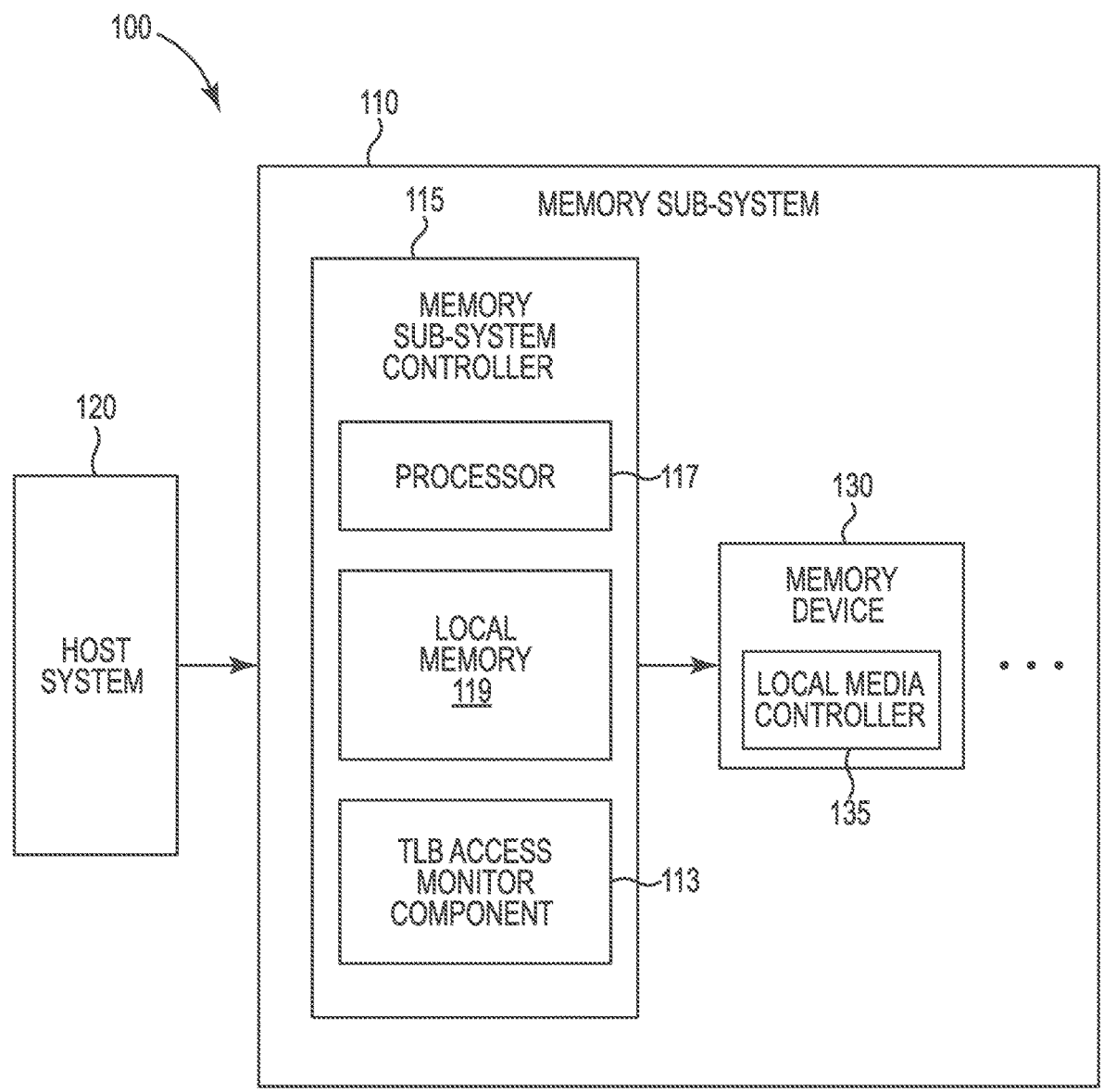
FIG. 1 illustrates an example computing system that includes a memory sub-system in accordance with some embodiments of the present disclosure.

Aspects of the present disclosure are directed to memory sub-systems, in particular to memory sub-systems that include a translation lookaside buffer (TLB) access monitor component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a three-dimensional cross-point memory device that includes a cross-point array of non-volatile memory cells. Other examples of non-volatile memory devices are described below in conjunction with FIG. 1. A non-volatile memory device, such as a three-dimensional cross-point memory device, can be a package of one or more memory components (e.g., memory dice). Each die can consist of one or more planes. Planes can be grouped into logic units. For example, a non-volatile memory device can be assembled from multiple memory dice, which can each form a constituent portion of the memory device.

A non-volatile memory device is a package of one or more dies. Each die can consist of one or more planes. Planes can be groups into logic units (LUN). Each plane can consist of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Memory technology is moving away from storage and towards a processing device, such as a central processing unit (CPU), within a memory hierarchy. This may cause system-level performance challenges for memory technologies having higher access latencies, such as DRAM. Some previous approaches to mitigating (e.g., reducing, hiding) access latencies may include caching and/or prefetching.

Memory technologies having memory access characteristics similar to those of DRAM, for example, can be positioned close to a processing device within a memory hierarchy. As a result, it can be beneficial to make such memory technologies operate in a manner similar to DRAM. Some previous approaches include prefetching and caching data to bridge the access time gap between DRAM and other types of memory. Such previous approaches may include keeping a recent history of access requests and/or accesses of data and using this history as an input signal to a prefetcher or cache. Effective caching and prefetching hardware can utilize many input signals to determine usage patterns and/or data temperatures. As used herein "data temperature" of metadata, corresponding to data value, is indicative of a likelihood of the data values being accessed (e.g., read, written, erased) in the near future. Data values that have not been accessed recently (e.g., not within a threshold amount of time) have decreased or lower data temperatures whereas data values that have been accessed recently (e.g., within a threshold amount of time) have increased or higher data temperatures.

Aspects of the present disclosure address deficiencies of previous approaches by monitoring a TLB, of a CPU, for instance, to drive decisions whether to prefetch and/or cache data on a memory device. TLB fill requests and/or TLB flush requests can be used as input signals to caching and/or prefetching to improve access latency of a memory device. As a non-limiting example of operation of a TLB, a CPU may issue a TLB fill request in response to software being executed by the CPU requesting to access a page of data of a memory device that does not have a corresponding page table entry (PTE) (e.g., an address of the memory device) stored in the TLB. Such a situation can be referred to as a TLB miss. In response to a TLB miss, hardware, of a host system, for instance, may perform a page table walk to retrieve the physical address mapping for the desired page of data. By detecting a TLB fill request, the physical address mapping of the desired page of data can be identified and extracted from the TLB fill request. Extracting the physical address mapping of the desired page of data can enable migration of the desired page of data to a faster tier of memory (e.g., DRAM) to occur at least partially concurrently with return of the TLB data to the CPU and a subsequent request for the page of data.

While a TLB fill request is indicative of a prefetch opportunity, a TLB flush request is indicative of a page of data having a decreased data temperature. Data values that are frequently accessed can be "hotter" than other data values that are not accessed as frequently. Data values having lower data temperatures can be candidates for removal (eviction) from a faster tier of memory (e.g., DRAM). For instance, a mapping of a virtual address of cooler data values to a physical address of a memory device may not be cached in a TLB. As a result, an access request for cooler data values will be preceded by a TLB fill request. A TLB fill request can be indicative of increases of data temperatures of cooler data values (the cooler data values are "warming up").

Embodiments of the present disclosure include forward-looking approaches where operation of a TLB is indicative of future states of a system including the TLB. In contrast to previous approaches to access latency mitigation that rely on historical data, embodiments of the present disclosure do not store any history. Rather, a TLB operation can be detected and used to directly predict whether data is likely to be accessed and/or likely not to be accessed. Predictions made by embodiments described herein to drive caching and/or prefetching are accurate because they are based on data temperatures, data from an operation system (OS) (e.g., page table mappings), and/or hardware capable of detecting memory accesses. Benefits of embodiments described herein include, but are not limited to, improved performance of a memory sub-system via hiding access latency and increased efficiency via less read/write amplification resulting from incorrect predictions of previous approaches. Embodiments of the present disclosure do not require changes to an existing processing device of a system and may require, if any, minor software changes at the OS level.

FIG. 1 illustrates an example computing system 100 that includes a memory sub-system 110 in accordance with some embodiments of the present disclosure. The memory sub-system 110 can include media, such as one or more non-volatile memory devices (e.g., memory device 130).

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface) that supports DDR), Open NAND Flash Interface (ONFI), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

Some examples of non-volatile memory devices (e.g., the memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

The memory device 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, the memory device 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory device 130 can be grouped as pages that can refer to a logical unit of the respective memory devices used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

Memory sub-system controller 115 can communicate with the memory device 130 to perform operations, such as reading data, writing data, and/or erasing data stored on the memory device 130, and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130. The memory sub-system controller 115 can be responsible for other operations such as wear leveling operations, garbage collection operations, error detection and error-correcting code (ECC) operations, encryption operations, caching operations, and address translations between a virtual address (e.g., logical block address (LBA), namespace) and a physical address (e.g., physical block address, physical media locations, etc.) that are associated with the memory device 130. The memory sub-system controller 115 can further include host interface circuitry to communicate with the host system 120 via the physical host interface. The host interface circuitry can convert the commands received from the host system 120 into command instructions to access the memory device 130 as well as convert responses associated with the memory device 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130.

In some embodiments, the memory device 130 includes local media controller 135 that operates in conjunction with memory sub-system controller 115 to execute operations on one or more memory cells of the memory device 130. An external controller (e.g., the memory sub-system controller 115) can externally manage the memory device 130 (e.g., perform media management operations on the memory device 130). In some embodiments, the memory device 130 can be a managed memory device. A managed memory device is a raw memory device combined with a local controller (e.g., the local controller 135) for media management within the same memory device package. An example of a managed memory device is a managed NAND (MNAND) device.

The memory sub-system 110 can include a TLB access monitor component 113. Although not shown in FIG. 1 so as to not obfuscate the drawings, the TLB access monitor component 113 can include special purpose circuitry in the form of an ASIC, FPGA, state machine, and/or other logic circuitry that can enable the TLB access monitor component 113 to predict access requests from the host system 120 to the memory device 130 based on TLB fill requests and/or TLB flush requests.

In some embodiments, the memory sub-system controller 115 includes at least a portion of the TLB access monitor component 113. For example, the memory sub-system controller 115 can include the processor 117 (e.g., processing device) configured to execute instructions stored in the local memory 119 for performing the operations described herein. In some embodiments, the TLB access monitor component 113 can be part of the host system 120, an application, or an OS.

In a non-limiting example, an apparatus (e.g., the computing system 100) can include the TLB access monitor component 113. The TLB access monitor component 113 can be resident on the memory sub-system 110. As used herein, the term "resident on" refers to something that is physically located on a particular component. For example, the TLB access monitor component 113 being "resident on" the memory sub-system 110 refers to a condition in which the hardware circuitry that comprises the TLB access monitor component 113 is physically located on the memory sub-system 110. The term "resident on" can be used interchangeably with other terms such as "deployed on" or "located on," herein. The TLB access monitor component 113 can be on die with the memory device 130.

The TLB access monitor component 113 can maintain a page table (not illustrated by FIG. 1). As used herein, the page table maintained by the TLB access monitor component 113 refers to one or more local page tables associated with respective memory devices 130. The TLB access monitor component 113 can be configured to receive signaling, from the host system 120, indicative of addresses associated with page table allocations and maintain the addresses in the page table. The TLB access monitor component 113 can be configured to prefetch data at a target address (e.g., a target physical address) of the memory device 130 associated with a TLB fill request in response to the page table including the target address. The TLB access monitor component 113 can initiate the prefetch for data at the target address in advance of receipt of the command (e.g., from the host system 120) to access the memory device 130 at the target address. As such, the TLB access monitor component 113 can be configured to, in response to the page table including the target address, issue, or cause to be issued, a prefetch command (e.g., via the memory sub-system controller 115) to the memory device 130 to retrieve data at the target address. The TLB access monitor component 113 can intercept (in some instances, concurrently with prefetching data at the target address) an access command from the host system 120 for data at the target address. In some embodiments, in response to issuing a prefetch command for data at the target address, signaling can be provided to the host system 120 to prevent the host system 120 from generating access commands for data at the target address during the prefetch. The TLB access monitor component 113 and/or the memory sub-system controller 115 can include logic to provide such signaling to the host system 120.

In some embodiments, the TLB access monitor component 113 can be configured to, in response to the page table maintained by the TLB access monitor component 113 not including a target address associated with a TLB fill request, provide an access command (e.g., an access request) for data at the address (e.g., received from the host system 120) to the memory device 130. Because the page table did not include the target address, a prefetch command is not issued. The memory device 130 can communicate the accessed data to the host system 120 directly, bypassing the TLB access monitor circuitry 113.

In some embodiments, the TLB access monitor component 113 can be configured to responsive to the page table including the address, provide, to the host system 120, signaling indicative of an increased data temperature of the data associated with the address in response to prefetching the data. The TLB access monitor component 113 can be configured to provide, to the memory device 130, signaling indicative of a decreased data temperature of a page of data associated with an address associated with a TLB flush request.

The TLB access monitor component 113 can determine whether a page table maintained on the circuitry includes a physical address of the memory device 130 corresponding to a virtual address of a TLB fill request from the host system 120. Responsive to determining that the page table includes the physical address, signaling indicative of a completion of the TLB fill request can be provided from the TLB access monitor component 113 to the host system 120. The TLB access monitor component 113 can prefetch, from the memory device 130, a page of data at the physical address. The TLB access monitor component 113 can provide, to the host system 120, signaling indicative of the page of data. Responsive to determining that the page table does not include the physical address, the TLB access monitor component 113 can forward, to the memory device 130, signaling from the host system 120 indicative of a command to access to the page of data at the physical address. The TLB access monitor component 113 can receive, from the memory device 130, signaling indicative of a PTE associated with the TLB fill request and decode the PTE to obtain the physical address corresponding to the virtual address of the TLB fill request.

Figure 2:
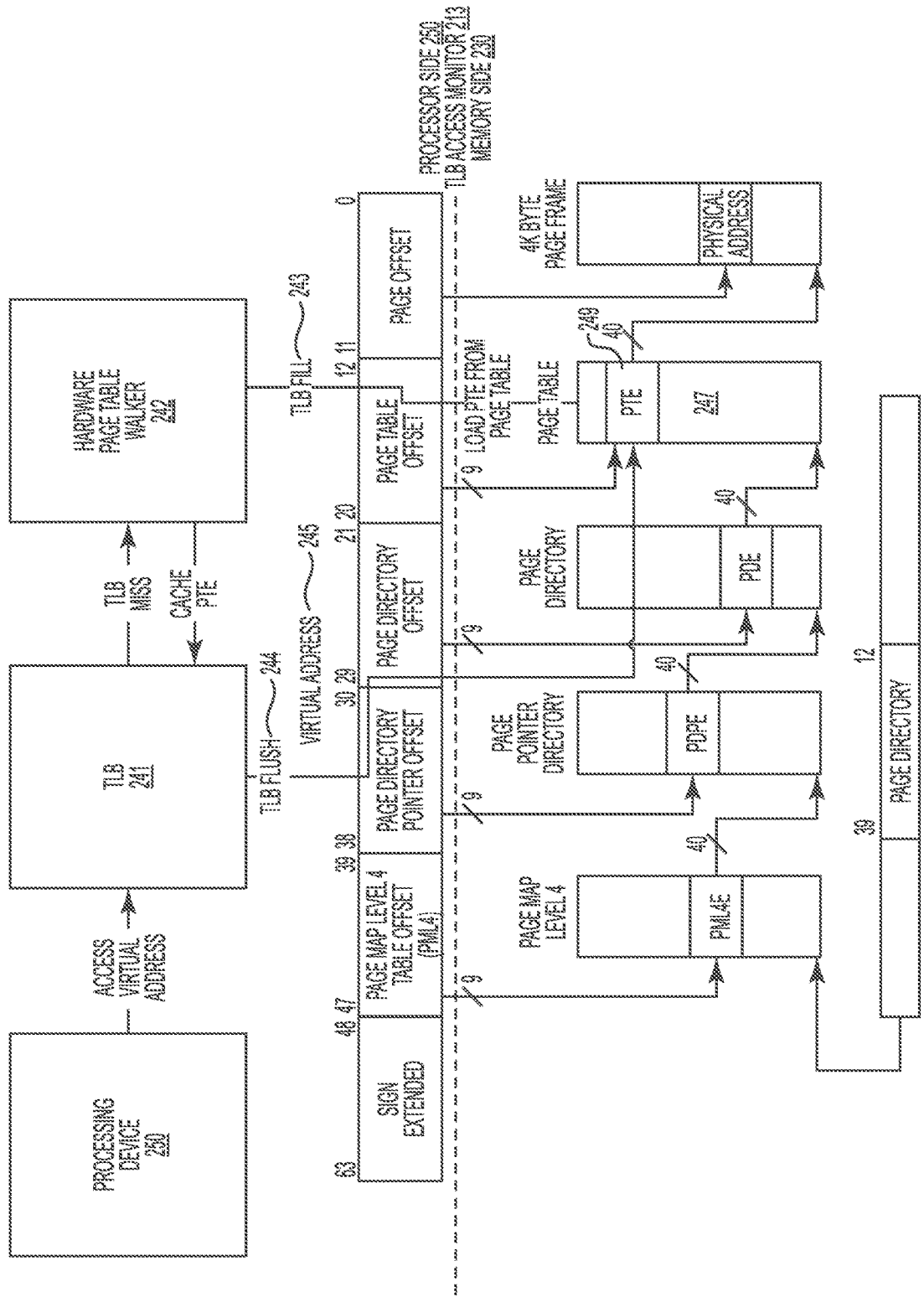
FIG. 2 is a block diagram representation of TLB access monitoring in accordance with some embodiments of the present disclosure.

FIG. 2 is a block diagram representation of TLB access monitoring in accordance with some embodiments of the present disclosure. The dashed line represents the TLB access monitor component 213 and functionality thereof. The TLB access monitor component 213 can be analogous to the TLB access monitor component 113 described in association with FIG. 1. The region of FIG. 2 illustrated above the dashed line includes representations of components and functionalities of a processing device 250. The processing device 250 can be a CPU, for example, of a host system, such as the host system 120. The region of FIG. 2 illustrated below the dashed line includes representations of components and functionalities of the memory device 230. The memory device 230 can be analogous to the memory device 130 described in association with FIG. 1.

Prior to accessing data stored on the memory device 230 at a virtual address 245, the processing device 250 can translate the virtual address 245 to a physical address of the memory device 230. To translate the virtual address 245, the processing device 250 can determine whether the TLB 241 includes the corresponding physical address. If the TLB 241 does not store the corresponding physical address, a TLB miss, then a page table walker 242 performs a TLB fill operation 243 by walking a page table 247 of the memory device 230 to retrieve a PTE 249, which includes the corresponding physical address, from the page table 247. The corresponding physical address is then stored (cached) in the TLB 241. By storing the corresponding physical address in the TLB 241, subsequent accesses for data at the virtual address 245 can retrieve the PTE 249 from the TLB 241 rather than the page table walker 242 accessing the page table 247 to retrieve the PTE 249. A PTE, such as the PTE 249, stored in the TLB 241 can be removed from the TLB 241 via a TLB flush operation 244. The TLB access monitor component 213 uses the TLB fill operation 243 and/or the TLB flush operation 244 as indications of future requests of data. Predictions made by the TLB access monitor component 213 are described further in association with FIGS. 3-4.

Figure 3:
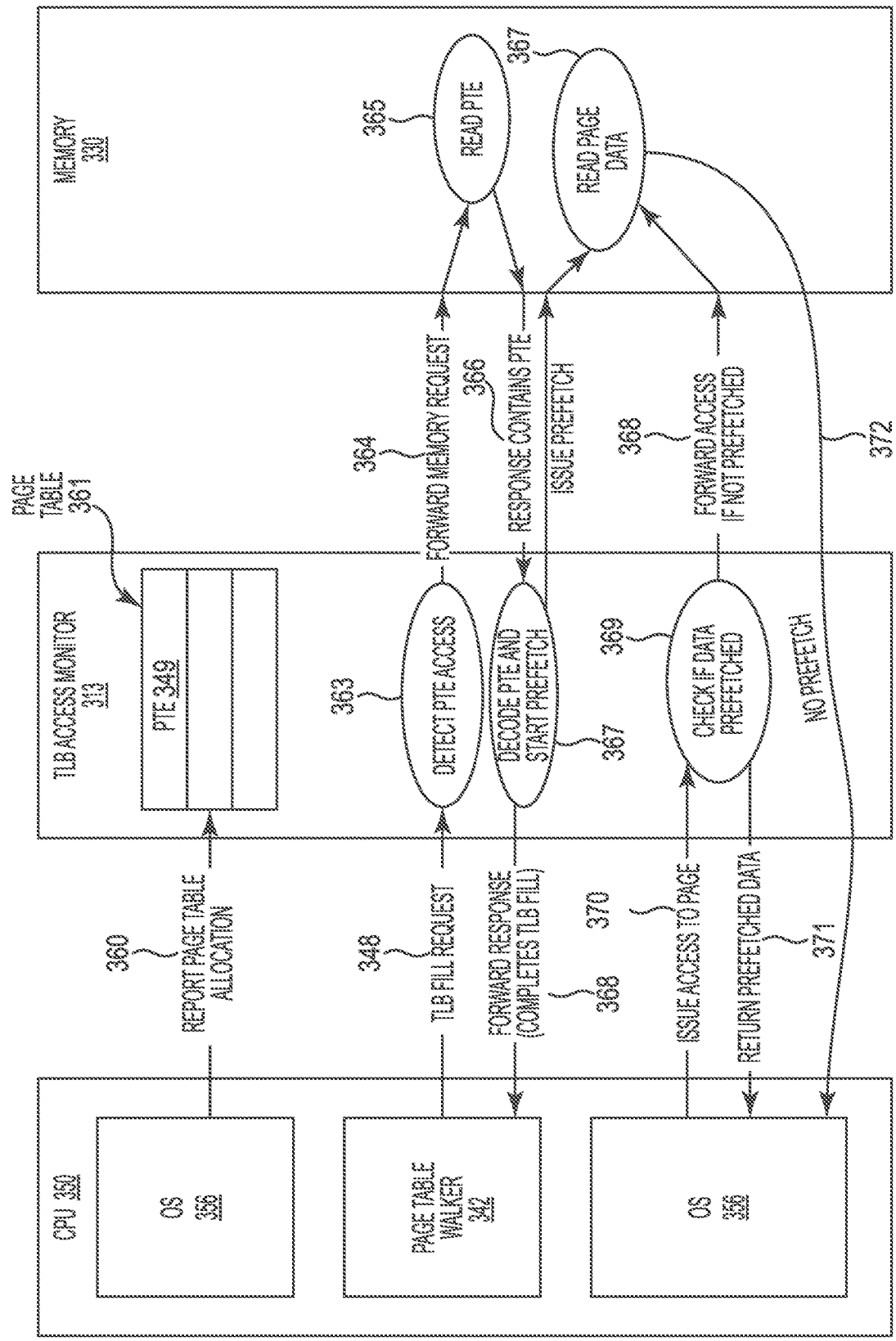
FIG. 3 is a block diagram representation of prefetching data based on a TLB fill request in accordance with some embodiments of the present disclosure.

FIG. 3 is a block diagram representation of prefetching data based on a TLB fill request in accordance with some embodiments of the present disclosure. The processing device (e.g., CPU) 350, the page table walker 342, the TLB access monitor component 313, the PTE 349, and the memory device 330 can be analogous to the processing device 250, the page table walker 242, the TLB access monitor component 213, the PTE 249, and the memory device 230 described in association with FIG. 2.

The page table walker 342 can issue a TLB fill request 348. Although the page table walker 342 is illustrated as a component of the CPU 350, embodiments are not so limited. For example, the page table walker 342 can be coupled to the CPU 350. As illustrated at 363, the TLB access monitor component 313 can detect the TLB fill request 348 and determine whether a PTE (e.g., the PTE 349) associated with the TLB fill request 348 is stored in a page table 361 of the TLB access monitor component 313. As illustrated at 360, the OS 356, which is executed by the CPU 350, can report page table allocations to the page table 361. The OS 356 is illustrated as two separated boxes for ease of illustration only and not intended to imply any differences.

The TLB access monitor component 313 can initiate a prefetch operation without an access request from the CPU 350 because the TLB access monitor component 313 uses the TLB fill request 348 as an indicator of the access request, at 370, that follows the TLB fill request 348. As illustrated at 352, the TLB access monitor component 313 can issue a prefetch request to the memory device 330. The prefetch request is for data stored at a physical address associated with the PTE. As illustrated at 367, in response to the prefetch request, the memory device 330 can read a page of data associated with the physical address. As illustrated at 371, the TLB access monitor component 313 can provide the prefetched page of data.

Access latency associated with reading the page of data from the memory device 330 is mitigated by the TLB access monitor component 313 initiating the prefetch operation, at 367, for the page of data before the OS 356 requests the page of data, at 370. The prefetch operation, at 367, for the page of data may take a similar amount of time to complete and provide the page of data, at 371, to the CPU 350 as completing a read operation associated with an access command issued by the CPU 350, at 370, and providing, at 372, the page of data to the CPU 350. However, because the prefetch operation, at 367, is initiated prior to receiving an access command, at 370, and a resulting read operation, the page of data is provided, at 371, to the CPU 350, by the TLB access monitor component 313, sooner than by a read operation resulting from the access request, at 372. As such, access latency of the memory device 330 is mitigated (e.g., at least partially hidden) because the page of data is provided to the CPU 350 earlier.

If the page table 361 does not include a target PTE of a PTE request, then the TLB access monitor component 313 does not initiate a prefetch operation. As illustrated at 365, the memory device 330 loads (reads) the target PTE in response to the TLB access monitor component 313 forwarding the request for the target PTE. As illustrated at 368, in response to receiving the target PTE loaded (read) from the memory device 330, the TLB access monitor component 313 provides a response, to the CPU 350, that completes the TLB fill operation (or is indicative of completion of the TLB fill operation). Then, as illustrated at 370, the OS 356 can issue an access command for the page of data associated with the physical address of the TLB fill request 348 in response to the completion of the TLB fill operation, to the CPU 350, that completes the TLB fill operation (or is indicative of completion of the TLB fill operation). Because a prefetch operation was not initiated, as determined by the TLB access monitor component 313 at 369, the TLB access monitor component 313 provides the access command to the memory device 330 as illustrated at 368. As illustrated at 367, the memory device 330 reads the page of data as part of a read operation in association with the access command. As illustrated at 372, the memory device 330 can provide the page of data directly to the CPU 350, bypassing the TLB access monitor component 313.

Figure 4:
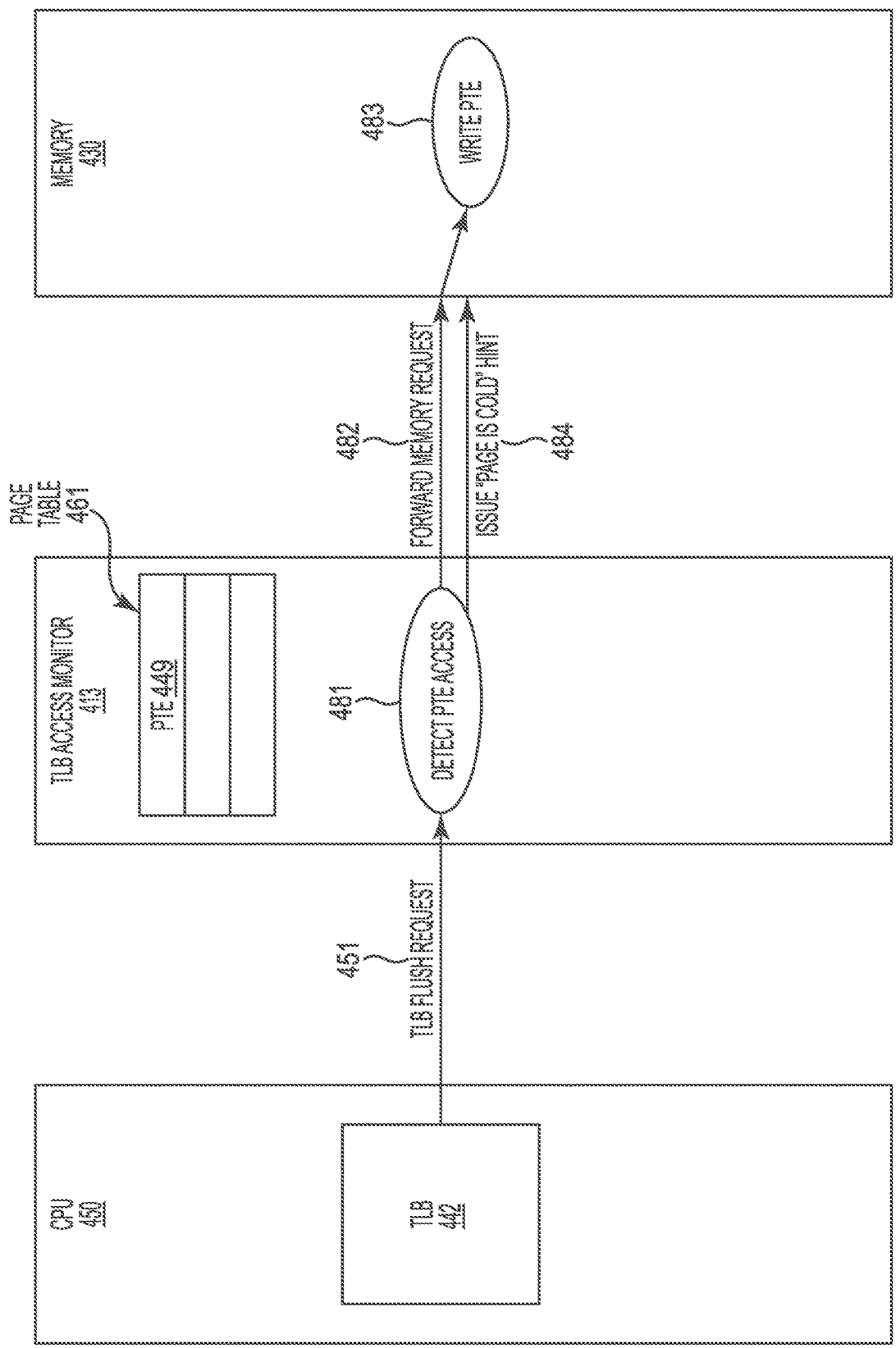
FIG. 4 is a block diagram representation of indicating data temperature based on a TLB flush request in accordance with some embodiments of the present disclosure.

FIG. 4 is a block diagram representation of indicating data temperature based on a TLB flush request in accordance with some embodiments of the present disclosure. The processing device (e.g., CPU) 450, the TLB access monitor component 413, the page table walker 442, and the memory device 430 can be analogous to the processing device 350, the TLB access monitor component 313, the page table walker 342, and the memory device 330 described in association with FIG. 3.

The TLB 442 can issue a TLB flush request 451. As illustrated at 481, the TLB access monitor component 413 can detect the TLB flush request 451. As illustrated at 482, the TLB access monitor component 413 can provide a memory request to the memory device 430. As illustrated at 483, the memory device 430 can write a PTE in association with the memory request. As illustrated at 484, the TLB access monitor component 413 can provide an indication of a cool or cold data temperature of a page of data at a physical address associated with the TLB flush request 451. The memory device 430 can use the indication of the cool or cold data temperature of the page of data that a TLB fill request will precede a subsequent access request for that page of data.

Figure 5:
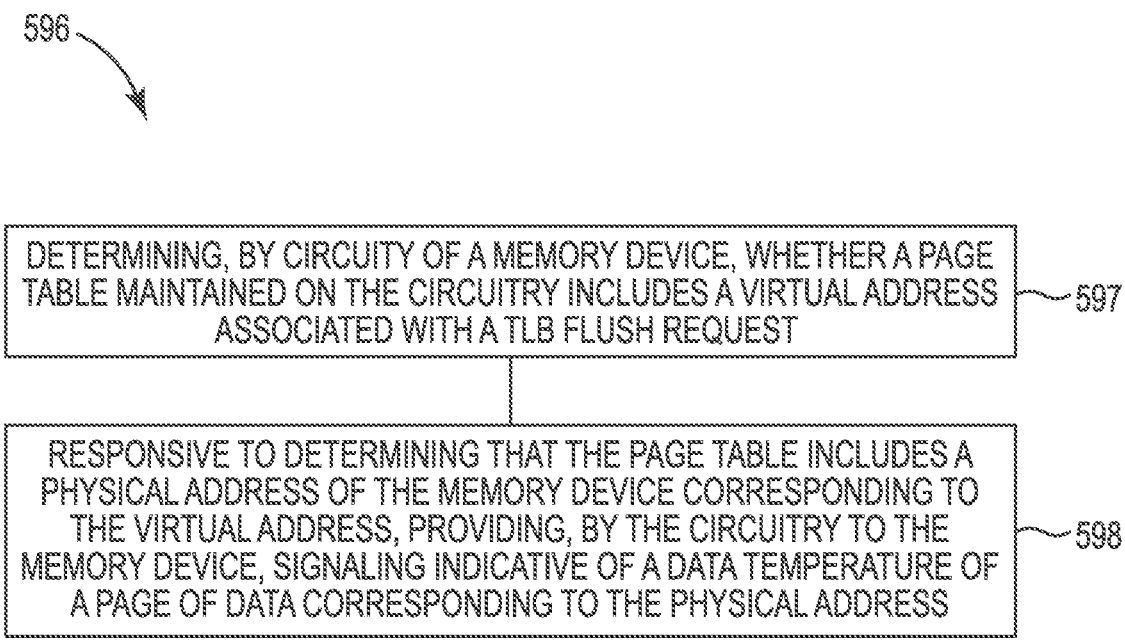
FIG. 5 is flow diagram corresponding to a method for TLB access monitoring in accordance with some embodiments of the present disclosure.

FIG. 5 is flow diagram corresponding to a method 596 for TLB access monitoring in accordance with some embodiments of the present disclosure. The method 596 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 596 is performed by the TLB access monitor component 113 described in association with FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 597, whether a page table maintained on circuitry of a memory device includes a virtual address associated with a TLB flush request can be determined by the circuitry.

At operation 598, responsive to determining that the page table includes a physical address of the memory device corresponding to the virtual address, signaling indicative of a data temperature of a page of data corresponding to the physical address can be provided by the circuitry to the memory device. The signaling indicative of the data temperature of the page of data can include an indication that the data temperature of the page of data is cool. The signaling indicative of the data temperature of the page of data can include an indication that the page of data has not been accessed within a threshold amount of time.

Although not specifically illustrated by FIG. 5, in some embodiments, the method 596 can include providing, by the circuitry to the memory device, different signaling indicative of the TLB flush request.

Figure 6:
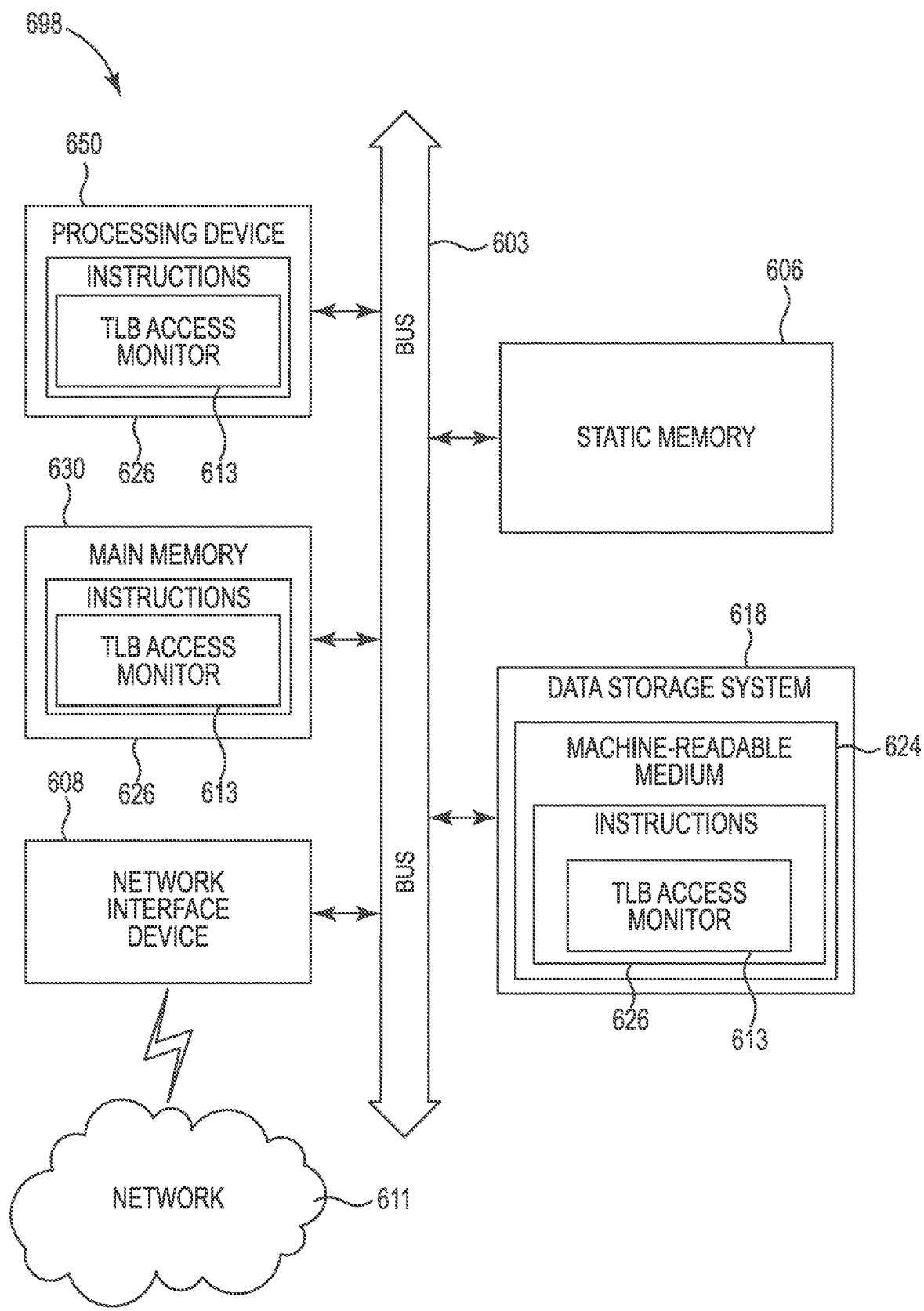
FIG. 6 is a block diagram of an example computer system in which embodiments of the present disclosure may operate.

FIG. 6 is a block diagram of an example computer system 698 in which embodiments of the present disclosure may operate. For example, FIG. 6 illustrates an example machine of a computer system 698 within which a set of instructions, for causing the machine to perform any one or more of the methodologies discussed herein, can be executed. In some embodiments, the computer system 698 can correspond to a host system (e.g., the host system 120 described in association with FIG. 1) that includes, is coupled to, or utilizes a memory sub-system (e.g., the memory sub-system 110) or can be used to perform the operations of a controller (e.g., to execute an operating system to perform operations corresponding to the TLB access monitor component 113). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 698 includes a processing device 650 (e.g., the processing device 350 described in association with FIG. 3), a main memory 630 (e.g., ROM, flash memory, DRAM such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 650 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 650 can also be one or more special-purpose processing devices such as an application specific integrated circuit (ASIC), a field programmable gate array (FPGA), a digital signal processor (DSP), network processor, or the like. The processing device 698 is configured to execute instructions 626 for performing the operations and steps discussed herein. The computer system 698 can further include a network interface device 608 to communicate over the network 611.

The data storage system 618 can include a machine-readable storage medium 624 (also referred to as a computer-readable medium) on which one or more sets of instructions 626 or software embodying any one or more of the methodologies or functions described herein is stored. The instructions 626 can also reside, completely or at least partially, within the main memory 604 and/or within the processing device 650 during execution thereof by the computer system 698, the main memory 630, and the processing device 698 also constituting machine-readable storage media. The machine-readable storage medium 624, data storage system 618, and/or main memory 630 can correspond to the memory sub-system 110.

In some embodiments, the instructions 626 can include instructions to implement functionality corresponding to a TLB access monitor component (e.g., the TLB access monitor component 113). For instance, the instructions 626 can include instructions to maintain a page table including a plurality of addresses of a memory device associated with a plurality of page table allocations by an operating system. The instructions 626 can include instructions to determine whether the page table includes a physical address associated with a TLB fill request. The instructions 626 can include instructions to, responsive to determining that the page table includes the physical address associated with the TLB fill request, initiate a prefetch operation for a page of data stored on the memory device at the physical address. The instructions 626 can include instructions to intercept, from the operating system, signaling indicative of a command to access a page of data stored on the memory device at the physical address. The instructions 626 can include instructions to, responsive to determining that the page table includes the physical address associated with the TLB fill request, prevent communication of the command to the memory device. The instructions 626 can include instructions to intercept the command concurrently with execution of the prefetch operation. The instructions 626 can include instructions to responsive to determining that the page table does not include the physical address associated with the TLB fill request, provide the command to the memory device.

While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
   circuitry couplable to a host system and a memory device, wherein the circuitry is configured to:
   determine whether a page table maintained on the circuitry includes a physical address of the memory device corresponding to a virtual address of a translation lookaside buffer (TLB) fill request from the host system; and
   responsive to determining that the page table includes the physical address corresponding to the virtual address:
   provide, to the host system, first signaling indicative of a completion to the TLB fill request;
   prefetch, using the physical address from the page table, a page of data at the physical address from the memory device; and
   provide, to the host system, second signaling indicative of the page of data.

2. The apparatus of claim 1, wherein the circuitry is further configured to, responsive to determining that the page table does not include the physical address corresponding to the virtual address of the TLB fill request:
   forward, to the memory device, third signaling indicative of the command from the host system to access the page of data at the physical address.

3. The apparatus of claim 1, wherein the circuitry is further configured to:
   receive, from the memory device, third signaling indicative of a page table entry (PTE) associated with the TLB fill request; and
   decode the PTE to obtain the physical address corresponding to the virtual address of the TLB fill request.

4. An apparatus, comprising:
   translation lookaside buffer (TLB) access monitor circuitry couplable to a memory device and comprising a page table,
   wherein the TLB access monitor circuitry is configured to:
   intercept, from a host system, a command to access the memory device at a physical address; and
   responsive to the page table including a physical address of the memory device corresponding to a virtual address associated with a TLB fill request:
   prevent communication of the command to the memory device;
   prefetch data at the physical address; and
   communicate the prefetched data to the host system.

5. The apparatus of claim 4, wherein the TLB access monitor circuitry is further configured to, responsive to the page table including the physical address, initiate the prefetch of the data in advance of intercepting the command to access the memory device.

6. The apparatus of claim 4, wherein the TLB access monitor circuitry is on die with the memory device.

7. The apparatus of claim 4, wherein the TLB access monitor circuitry comprises control circuitry of the memory device.

8. The apparatus of claim 4, wherein the TLB access monitor circuitry is further configured to, responsive to the page table not including the physical address, communicate the command to the memory device.

9. The apparatus of claim 8, wherein the memory device is further configured to, responsive to receipt of the command, communicate the data at the physical address to the host system, bypassing the TLB access monitor circuitry.

10. The apparatus of claim 4, wherein the TLB access monitor circuitry is further configured to:
    receive signaling, from a host system, indicative of a plurality of physical addresses of the memory device associated with page table allocations; and
    maintain the plurality of physical addresses in the page table.

11. The apparatus of claim 10, wherein the TLB access monitor circuitry is further configured to receive the signaling indicative of the addresses via a sideband channel of the memory device.

12. The apparatus of claim 4, wherein the TLB access monitor circuitry is further configured to responsive to the page table including the physical address, provide, to the host system, signaling indicative of an increased data temperature of the data associated with the physical address in response to prefetching the data.

13. The apparatus of claim 4, wherein the TLB access monitor circuitry is further configured to provide, to the memory device, signaling indicative of a decreased data temperature of a page of data associated with a different physical address of a TLB flush request.

14. A non-transitory medium storing instructions executable by a processing device to:
    maintain a page table including a plurality of virtual addresses and respective corresponding physical addresses of a memory device associated with a plurality of page table allocations by an operating system;
    determine whether the page table includes a physical address corresponding to a virtual address associated with a translation lookaside buffer (TLB) fill request; and responsive to determining that the page table includes the physical address, initiate a prefetch operation for a page of data stored on the memory device at the physical address.

15. The medium of claim 14, further storing instructions executable to:
intercept a command to access a page of data stored on the memory device at the physical address; and
responsive to determining that the page table includes the physical address, prevent communication of the command to the memory device.

16. The medium of claim 15, further storing instructions executable to intercept the command concurrently with execution of the prefetch operation.

17. The medium of claim 15, further storing instructions executable to, responsive to determining that the page table does not include the physical address, provide the command to the memory device.

* * * * *